United States Patent
Inagawa

(10) Patent No.: US 10,082,204 B2
(45) Date of Patent: Sep. 25, 2018

(54) CONTROL APPARATUS AND METHOD OF AUTOMATIC TRANSMISSION

(71) Applicant: HONDA MOTOR CO., LTD., Tokyo (JP)

(72) Inventor: Yasushi Inagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 77 days.

(21) Appl. No.: 15/458,401

(22) Filed: Mar. 14, 2017

(65) Prior Publication Data

US 2017/0268665 A1 Sep. 21, 2017

(30) Foreign Application Priority Data

Mar. 16, 2016 (JP) ................. 2016-052932
Mar. 16, 2016 (JP) ................. 2016-052933

(51) Int. Cl.
*F16H 61/02* (2006.01)
*F16H 61/00* (2006.01)
(Continued)

(52) U.S. Cl.
CPC ......... *F16H 61/0213* (2013.01); *F16H 59/72* (2013.01); *F16H 61/0021* (2013.01);
(Continued)

(58) Field of Classification Search
CPC ............... F16H 59/72; F16H 2059/725; F16H 61/0021; F16H 61/0213; F16H 2061/0241
See application file for complete search history.

(56) References Cited

U.S. PATENT DOCUMENTS 9,618,112 B2     4/2017  Yoshimura
2011/0029207 A1* 2/2011  Sasahara ............. F16D 48/06
                                                    701/56
(Continued)

FOREIGN PATENT DOCUMENTS

JP    H8-233090 A    9/1996
JP    2014-169750 A  9/2014
JP    2016-23662 A   2/2016

OTHER PUBLICATIONS

Japanese Office Action dated Sep. 25, 2017, issued in corresponding Japanese Patent Application No. 2016-052932 and partial English translation of the same. (10 pages).

(Continued)

*Primary Examiner* — Edwin A Young
(74) *Attorney, Agent, or Firm* — Fitzpatrick, Cella, Harper & Scinto

(57) ABSTRACT

A control apparatus of an automatic transmission including a plurality of gear mechanisms, frictional elements, an oil pressure supply device which supplies an oil pressure for operating the frictional elements between an engaged state and a disengaged state and an oil pressure controller which controls an oil pressure for operating the plurality of frictional elements. The oil pressure controller determines a heat quantity absorbed by the plurality of frictional elements when the frictional elements are switched between the engaged state and the disengaged state, and changes an operation state before the frictional elements proceed to the engaged state or the disengaged state, in accordance with whether the frictional elements have absorbed a predetermined heat quantity.

10 Claims, 9 Drawing Sheets

(51) Int. Cl.
*F16H 59/72* (2006.01)
*F16H 61/06* (2006.01)

(52) U.S. Cl.
CPC ...... *F16H 61/061* (2013.01); *B60Y 2300/184* (2013.01); *F16H 2059/725* (2013.01); *F16H 2061/0241* (2013.01); *Y02T 10/76* (2013.01)

(56) References Cited

U.S. PATENT DOCUMENTS

| | | | | |
|---|---|---|---|---|
| 2011/0035125 A1* | 2/2011 | Sasahara | ............... | F16H 61/061 701/58 |
| 2012/0290248 A1* | 11/2012 | Hebbale | .................. | F16D 48/06 702/130 |

OTHER PUBLICATIONS

Japanese Office Action dated Sep. 25, 2017, issued in corresponding Japanese Patent Application No. 2016-052933 and partial English translation of the same. (10 pages).

\* cited by examiner

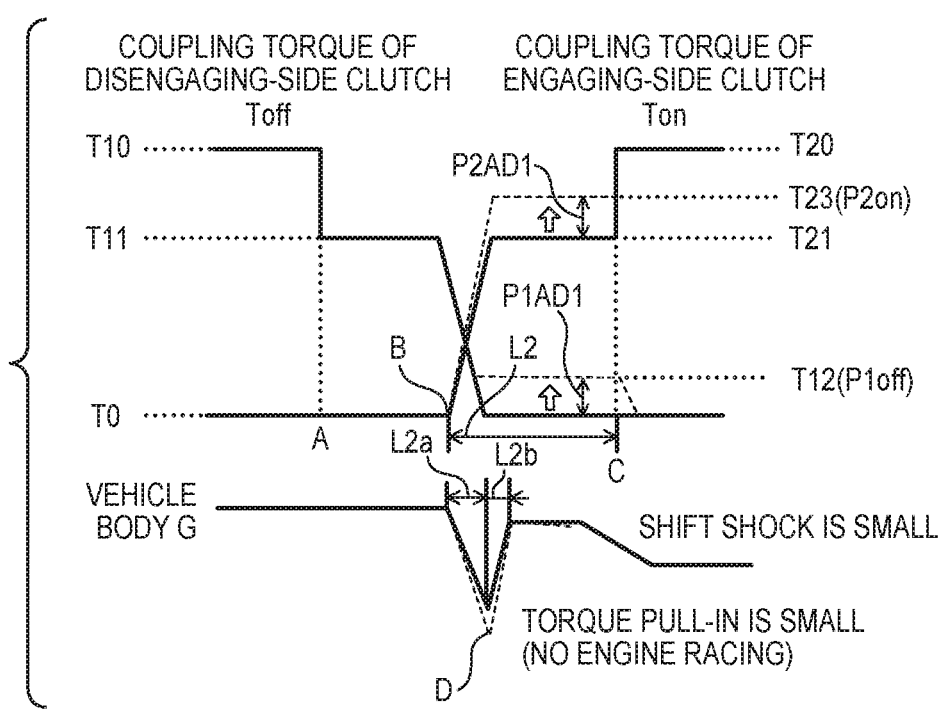

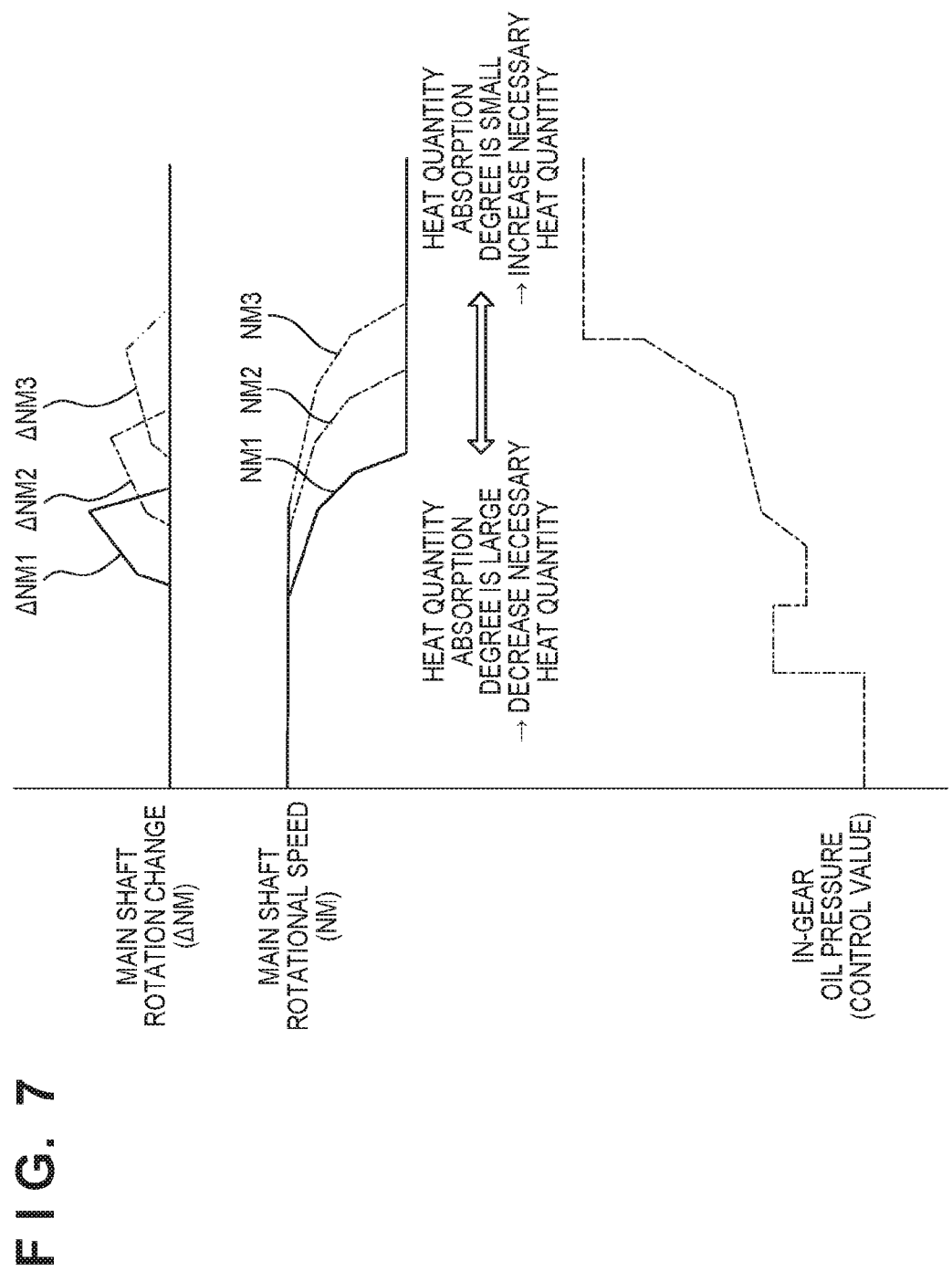

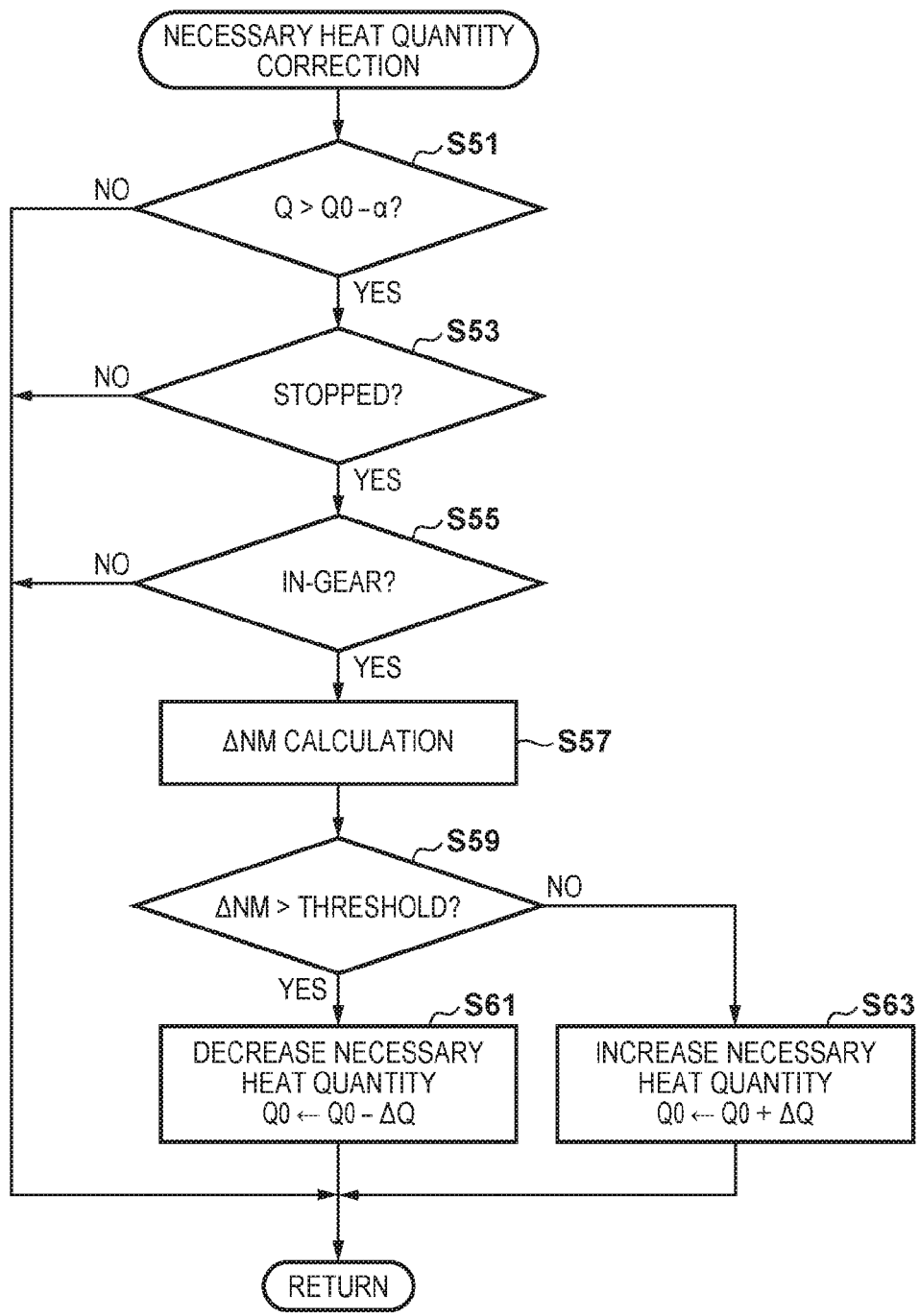

CONTROL APPARATUS AND METHOD OF AUTOMATIC TRANSMISSION

CROSS-REFERENCE TO RELATED APPLICATIONS

This application is based upon and claims the benefit of priority from the prior Japanese Patent Application No. 2016-052932 and Japanese Patent Application No. 2016-052933, both filed on Mar. 15, 2016, the entire contents of which are incorporated herein by reference.

BACKGROUND OF THE INVENTION

Field of the Invention

The present invention relates to initial run-in control of a clutch of an automatic transmission.

Description of the Related Art

Japanese Patent Laid-Open No. 8-233090 describes a technique which performs control such that a torque phase after gear change (speed change) is started in a hydraulic transmission immediately changes to an inertia phase without decreasing the torque, thereby protecting a driver from feeling a shock at a gear change (shift shock).

Normally, multi-plate wet clutches for use in an automatic transmission of a vehicle each have a variation in friction coefficient (μ) of the clutch surface. Therefore, in a predetermined period during which an unused clutch absorbs a predetermined amount of heat, an initial fitting process (initial run-in) of heating the clutch surface is necessary. In a period during which this initial run-in is incomplete, the friction coefficient of the clutch surface tends to be small. Accordingly, if normal shift control is performed by assuming that initial run-in is complete, torque missing by which torque transmission is temporarily interrupted during the shift operation occurs. Consequently, the main shaft rotational speed of the transmission fluctuates during the shift operation, so an engine rotation increase (engine racing) occurs or shift shock worsens.

To solve these problems, engine racing can be suppressed by setting a high clutch surface pressure (coupling torque) during coupling if it is assumed that initial run-in is incomplete, but the shift shock often worsens. There is also a method of learning the initial friction coefficient of a clutch for which no initial run-in is performed. Since, however, a change in initial friction coefficient is abrupt and largely varies, no learning precision can be assured, so the method is not an effective solution. Furthermore, the initial friction characteristic of a clutch varies from one clutch to another, so it is necessary to take this individual difference into consideration as well.

In a period during which initial run-in is incomplete, therefore, it is necessary to promote initial run-in while performing control so as to suppress engine racing and shift shock during a shift operation.

SUMMARY OF THE INVENTION

The present invention has been made in consideration of the aforementioned problems, and realizes an automatic transmission control technique capable of promoting initial run-in of frictional elements of an automatic transmission while suppressing engine racing and shift shock in a period requiring initial run-in.

In order to solve the aforementioned problems, the first aspect of the present invention provides a control apparatus of an automatic transmission including a plurality of gear mechanisms and frictional elements for establishing a gear stage, comprising: an oil pressure supply device configured to supply an oil pressure for operating the frictional elements between an engaged state in which the frictional elements are coupled to enable torque transmission, and a disengaged state in which the engaged state is released; and an oil pressure controller configured to control an oil pressure for operating the plurality of frictional elements such that one of the frictional elements is engaged and the other of the frictional elements is disengaged during a shift operation, wherein the oil pressure controller determines a heat quantity absorbed by the plurality of frictional elements when the frictional elements are switched between the engaged state and the disengaged state, and changes an operation state before the frictional elements proceed to the engaged state or the disengaged state, in accordance with whether the frictional elements have absorbed a predetermined heat quantity.

According to the present invention, it is possible to promote initial run-in of an automatic transmission while suppressing engine racing and shift shock in a period requiring initial run-in.

Other features and advantages besides those discussed above shall be apparent to those skilled in the art from the description of an embodiment of the invention as follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 3B is a timing chart showing changes in clutch coupling torques during a shift operation under shift control for suppressing engine racing before initial run-in;

FIG. 3C is a timing chart showing changes in clutch coupling torques during a shift operation under initial run-in control of the embodiment;

FIG. 7 is a view for explaining a necessary heat quantity correcting process under initial run-in control of the embodiment; and FIG. 8 is a flowchart showing the necessary heat quantity correcting process under initial run-in control of the embodiment.

DESCRIPTION OF THE EMBODIMENTS

An automatic transmission control apparatus of an embodiment according to the present invention will be explained below with reference to the accompanying drawings.

[Apparatus Configuration]

First, the configuration of the automatic transmission control apparatus of the present embodiment will be explained with reference to FIGS. 1 and 2.

Figure 1:
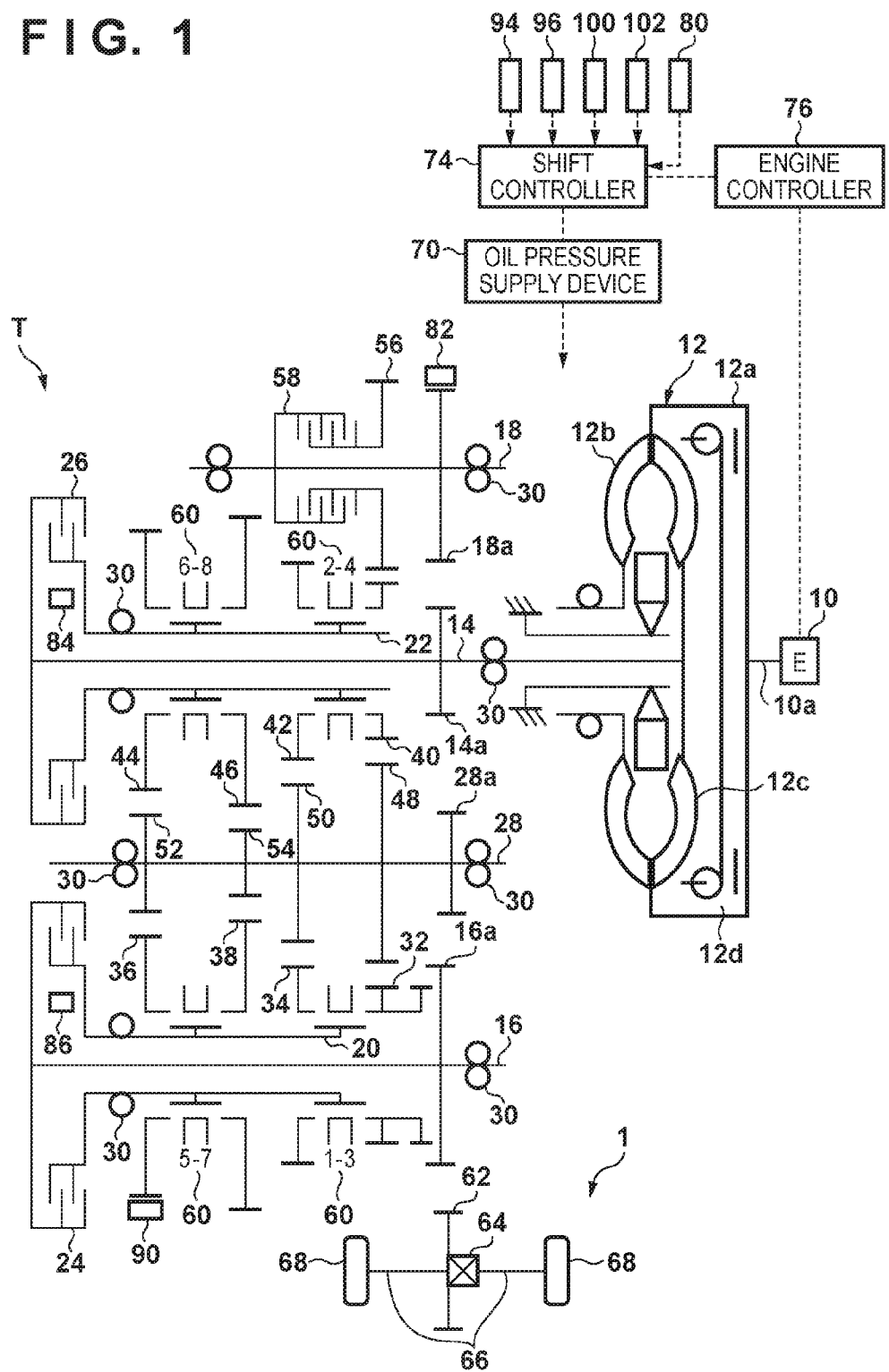
FIG. 1 is a view showing an overall configuration of an automatic transmission control apparatus of an embodiment according to the present invention.

As shown in FIG. 1, an automatic transmission (to be referred to as a transmission hereinafter) T is a twin-clutch transmission having transmission stages of eight forward speeds and one reverse speed, and has ranges D, P, R, and N.

The transmission T includes an even-numbered-stage (—step) input shaft 14 having second, fourth, sixth, and eighth speeds and connected to a driving shaft 10*a*, which is connected to the crankshaft of an engine (motor) 10, via a torque converter 12, and also includes an odd-numbered-stage (—step) input shaft 16 having first, third, fifth, and seventh speeds in parallel to the even-numbered-stage input shaft 14. The engine 10 is, for example, a spark ignition internal combustion engine using gasoline as a fuel.

The torque converter 12 includes a pump impeller 12*b* fixed to a drive plate 12*a* directly connected to the driving shaft 10*a* of the engine 10, a turbine runner 12*c* fixed to the even-numbered-stage input shaft 14, and a lock-up clutch 12*d*. Accordingly, the driving force (rotation) of the engine 10 is transmitted to the even-numbered-stage input shaft 14 via the torque converter 12.

An idling shaft 18 is formed in parallel to the even-numbered-stage input shaft 14 and odd-numbered-stage input shaft 16. The even-numbered-stage input shaft 14 is connected to the idling shaft 18 via gears 14*a* and 18*a*, and the odd-numbered-stage input shaft 16 is connected to the idling shaft 18 via a gear 16*a* and the gear 18*a*. Therefore, the even-numbered-stage input shaft 14, odd-numbered-stage input shaft 16, and idling shaft 18 rotate as the engine 10 rotates.

Also, a first sub input shaft 20 and a second sub input shaft 22 are respectively arranged on the outer circumferential surfaces of the odd-numbered-stage input shaft 16 and even-numbered-stage input shaft 14 so as to be coaxial and relatively rotatable.

The odd-numbered-stage input shaft 16 and first sub input shaft 20 are connected via a first clutch 24, and the even-numbered-stage input shaft 14 and second sub input shaft 22 are connected via a second clutch 26. Each of the first and second clutches 24 and 26 is a multi-plate wet clutch which operates when the pressure (oil pressure) of hydraulic oil is supplied. When the oil pressure is supplied, the first and second clutches 24 and 26 couple (engage) the first and second sub input shafts 20 and 22 with the odd-numbered-stage input shaft 16 and even-numbered-stage input shaft 14.

An output shaft 28 is placed between the even-numbered-stage input shaft 14 and odd-numbered-stage input shaft 16 in parallel with the even-numbered-stage input shaft 14 and odd-numbered-stage input shaft 16. The even-numbered-stage input shaft 14, odd-numbered-stage input shaft 16, idling shaft 18, and output shaft 28 are rotatably supported by a bearing 30.

A first-speed drive gear 32, a third-speed drive gear 34, a fifth-speed drive gear 36, and a seventh-speed drive gear 38 are fixed to the first sub input shaft 20 on the odd-numbered-stage side, and a second-speed drive gear 40, a fourth-speed drive gear 42, a sixth-speed drive gear 44, and an eighth-speed drive gear 46 are fixed to the second sub input shaft 22 on the even-numbered-stage side.

A first/second-speed driven gear 48 which meshes with the first-speed drive gear 32 and second-speed drive gear 40, a third/fourth-speed driven gear 50 which meshes with the third-speed drive gear 34 and fourth-speed drive gear 42, a fifth/sixth-speed driven gear 52 which meshes with the fifth-speed drive gear 36 and sixth-speed drive gear 44, and a seventh/eighth-speed driven gear 54 which meshes with the seventh-speed drive gear 38 and eighth-speed drive gear 46 are fixed to the output shaft 28.

An RVS (reverse) idling gear 56 which meshes with the first/second-speed driven gear 48 fixed to the output shaft 28 is rotatably supported by the idling shaft 18. The idling shaft 18 and RVS idling gear 56 are connected via an RVS clutch 58. Like the first and second clutches 24 and 26, the RVS clutch 58 is a multi-plate wet clutch which operates when the oil pressure is supplied.

A first/third-speed gear selecting mechanism 60 (1-3) for selectively coupling (fixing) the first-speed drive gear 32 and third-speed drive gear 34 to the first sub input shaft 20, and a fifth/seventh-speed gear selecting mechanism 60 (5-7) for selectively coupling (fixing) the fifth-speed drive gear 36 and seventh-speed drive gear 38 to the first sub input shaft 20, are arranged for the odd-numbered-stage input shaft 16.

A second/fourth-speed gear selecting mechanism 60 (2-4) for selectively coupling (fixing) the second-speed drive gear 40 and fourth-speed drive gear 42 to the second sub input shaft 22, and a sixth/eighth-speed gear selecting mechanism 60 (6-8) for selecting coupling (fixing) the sixth-speed drive gear 44 and eighth-speed drive gear 46 to the second sub input shaft 22, are arranged for the even-numbered-stage input shaft 14. In the following description, the first/third-speed, second/fourth-speed, fifth/seventh-speed, and sixth/eighth-speed gear selecting mechanisms will generally be referred to as gear selecting mechanisms 60 in some cases.

When the first clutch 24 or second clutch 26 is coupled (engaged), the driving force of the engine 10 is transmitted from the odd-numbered-stage input shaft 16 to the first sub input shaft 20 or from the even-numbered-stage input shaft 14 to the second sub input shaft 22, and further transmitted to the output shaft 28 via the above-described drive gears and driven gears.

Note that in a reverse operation, the driving force of the engine 10 is transmitted to the output shaft 28 via the even-numbered-stage input shaft 14, gear 14*a*, gear 18*a*, RVS clutch 58, idling shaft 18, RVS idling gear 56, and first/second-speed driven gear 48. The output shaft 28 is connected to a differential mechanism 64 via a gear 62, and the differential mechanism 64 is connected to wheels 68 via drive shafts 66. A vehicle 1 is indicated by the wheels 68 and the like.

All the gear selecting mechanisms 60 perform a shift operation when the oil pressure is supplied. An oil pressure supply device 70 supplies the oil pressure (proportional to the clutch surface pressure and coupling torque) to the gear selecting mechanisms, first and second clutches 24 and 26, and RVS clutch 58. Note that the oil pressure to the first and second clutches 24 and 26 and RVS clutch 58 is proportional to the coupling torque (clutch surface pressure) which acts on each clutch when the clutch is disengaged and engaged during a shift operation. In the present embodiment, therefore, the oil pressure supplied to a clutch represents the coupling torque of each of clutches on the disengaging side (part) and engaging side (part), and the coupling torque represents the oil pressure supplied to the clutch. Also, the coupling torque (supplied oil pressure) to each clutch in a shift operation is determined in accordance with the engine torque, and used in the calculation of an oil-pressure control signal.

The configuration of the oil pressure supply device 70 will be explained below with reference to an oil pressure circuit diagram shown in FIG. 2.

Figure 2:
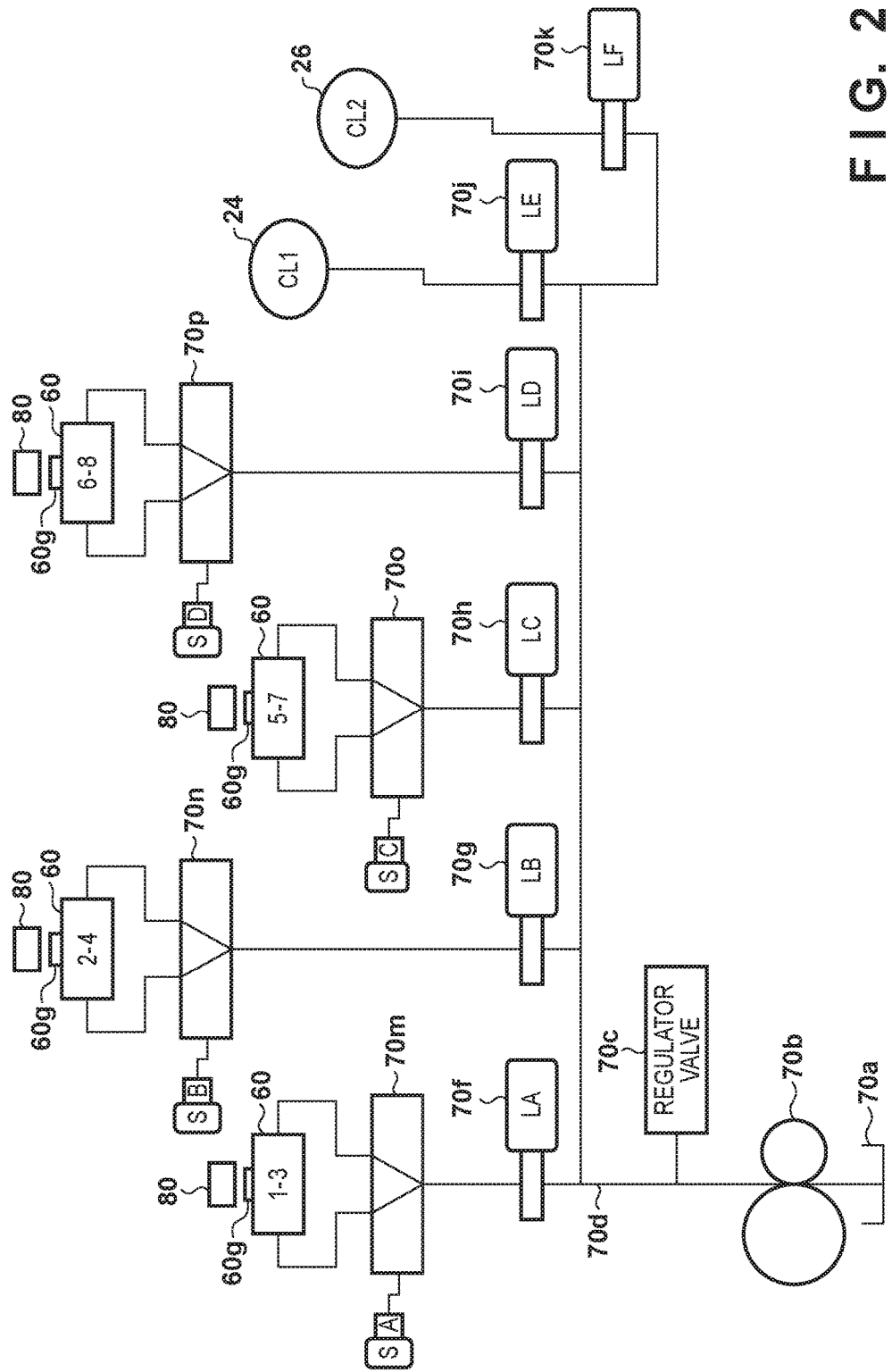
FIG. 2 is a hydraulic circuit diagram showing details of the arrangement of an oil pressure supply device shown in FIG. 1.

In the oil pressure supply device 70 as shown in FIG. 2, the discharge pressure (oil pressure) of hydraulic oil ATF pumped up from a reservoir 70*a* by a hydraulic pump (oil supply pump) 70*b* is regulated (reduced) to a line pressure PL by a regulator valve (pressure regulating valve) 70*c*.

Although not shown, the hydraulic pump 70*b* is connected to the pump impeller 12*b* of the torque converter 12 via a gear, and hence operates when driven by the engine 10.

The regulated line pressure is supplied from an oil passage 70*d* to the input ports of a first linear solenoid valve (LA) 70*f*, a second linear solenoid valve (LB) 70*g*, a third linear solenoid valve (LC) 70*h*, a fourth linear solenoid valve (LD) 70*i*, a fifth linear solenoid valve (LE) 70*j*, and a sixth linear solenoid valve (LF) 70*k*.

The first, second, third, fourth, fifth, and sixth linear solenoid valves 70*f*, 70*g*, 70*h*, 70*i*, 70*j*, and 70*k* are electromagnetic hydraulic control valves. Each valve moves a spool in proportional to the amount of electric current, thereby linearly changing the output pressure from an output port. In addition, the valve is configured as an N/C (Normal Close) valve in which the spool moves to an open position when an electric current is supplied.

The output port of the first linear solenoid valve (LA) 70*f* is connected to the piston chamber of the first/third-speed gear selecting mechanism 60 (1-3) via a first servo shift valve 70*m*. The output port of the second linear solenoid valve (LB) 70*g* is connected to the piston chamber of the second/fourth-speed gear selecting mechanism 60 (2-4) via a second servo shift valve 70*n*.

The output port of the third linear solenoid valve (LC) 70*h* is connected to the piston chamber of the fifth/seventh-speed gear selecting mechanism 60 (5-7) via a third servo shift valve 70*o*. The output port of the fourth linear solenoid valve (LD) 70*i* is connected to the piston chamber of the sixth/eighth-speed gear selecting mechanism 60 (6-8) via a fourth servo shift valve 70*p*.

The servo shift valves 70*m*, 70*n*, 70*o*, and 70*p* are respectively connected to ON/OFF solenoid valves (electromagnetic hydraulic control valves) SA, SB, SC, and SD. In accordance with excitation and demagnetization of each solenoid, the servo shift valve outputs the oil pressure input from the linear solenoid valve 70*f* or the like as a line pressure from one of output ports (left and right output ports in FIG. 2).

The output port of the fifth linear solenoid valve 70*j* is connected to the first clutch (CL1) 24 of the odd-numbered-stage input shaft 16. The output port of the sixth linear solenoid valve 70*k* is connected to the piston chamber of the second clutch (CL2) 26 of the even-numbered-stage input shaft 14.

When the oil pressure is supplied, the first or second clutch 24 or 26 couples (engages) the first or second sub input shaft 20 or 22 with the odd-numbered-stage input shaft 16 or even-numbered-stage input shaft 14. When the oil pressure is discharged, the first or second clutch 24 or 26 disconnects (decouples) the first or second sub input shaft 20 or 22 from the odd-numbered-stage input shaft 16 or even-numbered-stage input shaft 14.

The transmission T of the present embodiment performs a pre-shift operation of supplying the oil pressure to a gear selecting mechanism 60 corresponding to the next transmission stage and coupling (engaging) the mechanism 60 to one of the first and second sub input shafts 20 and 22. Then, the transmission T discharges the oil pressure from one of the first and second clutches 24 and 26, which corresponds to the current transmission stage, and supplies the oil pressure to the other one of the first and second clutches 24 and 26, which corresponds to the sub input shaft corresponding to the next transmission stage, thereby coupling (engaging) the clutch with the first input shaft 14 or second input shaft 16 and changing gears. This gear change (speed change) is basically alternately performed between the odd-numbered stages (first, third, fifth, and seventh speeds) and the even-numbered stages (second, fourth, sixth, and eighth speeds).

Note that the oil pressure supply device 70 of the present embodiment includes a plurality of linear solenoid valves and the like in addition to the above-described components, and also controls a coupling/decoupling operation of the lock-up clutch 12*d* of the torque converter 12, but a detailed explanation thereof will be omitted.

Note also that the transmission T of the present embodiment includes a shift controller 74. The shift controller 74 forms an electronic control unit (ECU) including a CPU as an arithmetic processor, a ROM storing a shift control program and shift map, a RAM for temporarily storing arithmetic data and the like, and an input/output circuit for exchanging data between controllers. Likewise, an engine controller 76 forms an electronic control unit (ECU) including a CPU as an arithmetic processor, a ROM storing an engine control program and the like, a RAM for temporarily storing arithmetic data and the like, and an input/output circuit for exchanging data between controllers.

The shift controller 74 communicates with the engine controller 76, and acquires information such as the engine speed (NE), throttle position (TH), and accelerator position (AP) from the engine controller 76.

Also, magnetic members are attached to fork shafts 60*f* fixed to the shift forks of the four gear selecting mechanisms 60, and stroke sensors 80 are arranged near the magnetic members. The stroke sensor 80 generates, through an output indicating a stroke (shift) in the axial direction of the shift fork, in other words, the sleeve 60*g*, an output (voltage value) indicating the shift position of the gear selecting mechanism, more specifically, a position when the sleeve 60*g* strokes from a gear-in position to a neutral position.

Furthermore, first, second, third, and fourth rotational speed sensors 82, 84, 86, and 90 are arranged in the transmission T, and respectively output a signal indicating an input shaft (main shaft) rotational speed NM of the transmission T, signals indicating the rotational speeds of the first and second sub input shafts 20 and 22, and a signal indicating a rotational speed (the output rotational speed of the transmission T) NC (which can also be called a vehicle speed V) of the output shaft 28.

First and second pressure sensors 94 and 96 are arranged along oil passages in the oil pressure supply device 70, which are connected to the first and second clutches 24 and 26, and output signals indicating the pressures (oil pressures) of the hydraulic oil ATF to be supplied to the first and second clutches 24 and 26. In addition, a temperature sensor 100 is arranged near the reservoir 70*a*, and outputs a signal indicating an oil temperature (the temperature of the hydraulic oil ATF) TATF.

Also, a range selector position sensor 102 is arranged near a range selector (not shown) placed in the driver's seat of the vehicle 1, and outputs a signal indicating a range operated (selected) by the driver from ranges P, R, N, and D arranged on the range selector in this order from above when viewed from the driver.

All the sensor outputs are input to the shift controller 74. Based on each sensor output and information obtained from the engine controller 76, the shift controller 74 controls the operations of the first and second clutches 24 and 26 and gear selecting mechanisms 60 by exciting and demagnetizing the first to sixth linear solenoid valves 70f to 70k, thereby controlling the shift operation of the transmission T.

The shift controller 74 determines a shift position (transmission stage) in accordance with the running state defined by the vehicle speed V and accelerator position AP of the vehicle 1 and based on the shift map (not shown), and the oil pressure supply device 70 supplies the oil pressure to the gear selecting mechanisms 60, first and second clutches 24 and 26, and RVS clutch 58, thereby establishing a predetermined transmission stage.

In accordance with the running state defined by the vehicle speed V and accelerator position AP and based on the shift map (not shown), the shift controller 74 supplies the oil pressure to a first input shaft (the odd-numbered-stage input shaft 16 and first sub input shaft 20) formed by the first/third-speed gear selecting mechanism 60 (1-3) or fifth/seventh-speed gear selecting mechanism 60 (5-7) of the four gear selecting mechanisms 60 and the first clutch 24, one of the four (a plurality of) gear selecting mechanisms 60, and a first output path extending from the first clutch 24 to the output shaft 28, or a second input shaft (the even-numbered-stage input shaft 14 and second sub input shaft 22), another one of the four gear selecting mechanisms 60, and a second output path extending from the second clutch 26 to the output shaft 28, and controls the operation of the transmission T so as to shift the driving force of the engine 10 and output the driving force by a shift gear which is a corresponding gear from the first-speed drive gear 32 coupled by a sleeve 60g of the gear selecting mechanism 60 forming one side to the seventh/eighth-speed driven gear 54.

[Initial Run-in Control]

Next, initial run-in control of the transmission T of the present embodiment will be explained with reference to timing charts shown in FIGS. 3A to 3C and a flowchart shown in FIG. 4.

First, the feature and effect of initial run-in control of the present embodiment will be explained with reference to FIGS. 3A to 3C, in comparison with normal shift control and shift control before conventional initial run-in.

Figure 3A:
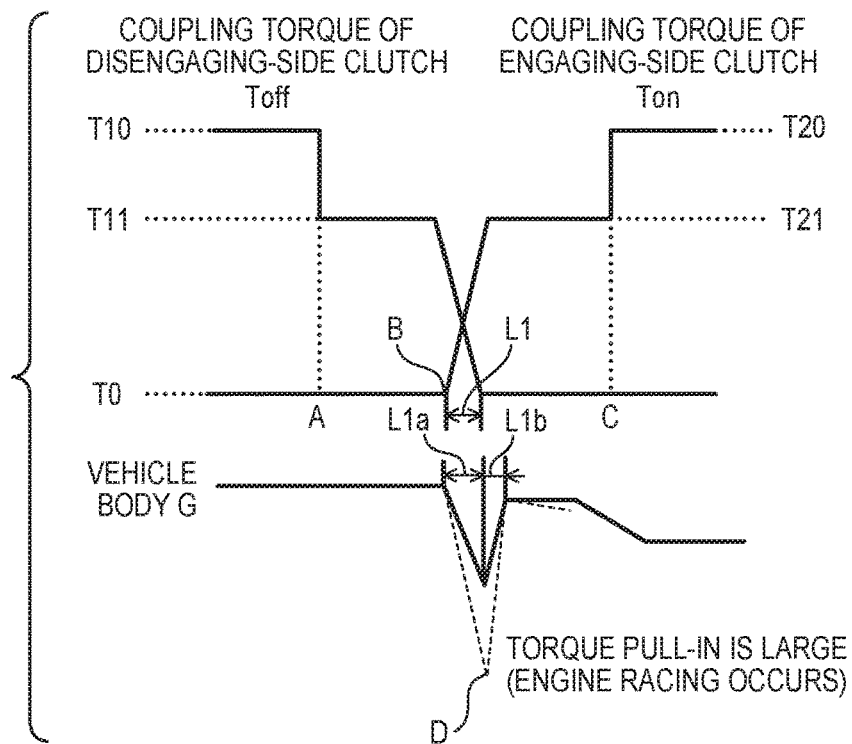
FIG. 3A is a timing chart showing changes in clutch coupling torques during a shift operation under normal shift control.

FIG. 3A is a timing chart showing changes in coupling torques of a disengaging-side clutch and engaging-side clutch during a shift operation performed by normal shift control (after initial run-in). FIG. 3B is a timing chart showing changes in coupling torques of the disengaging-side clutch and engaging-side clutch during a shift operation performed by shift control when the coupling-side clutch torque is set high in order to suppress engine racing before initial run-in. FIG. 3C is a timing chart showing changes in coupling torques of the disengaging-side clutch and engaging-side clutch during a shift operation performed by initial run-in control of the present embodiment. Note that in the twin-clutch transmission T of the present embodiment, each of the disengaging-side clutch and engaging-side clutch corresponds to one of the first and second clutches 24 and 26 which repeat disengagement and engagement during a shift operation.

In the normal shift control shown in FIG. 3A, gear change is started at a timing at which the running state defined by the vehicle speed V and accelerator position AP exceeds a shift-up line or shift-down line of the shift map (not shown). When gear change is started, the above-described pre-shift operation is performed first. When the pre-shift operation is performed, a coupling torque Toff is decreased from T10 to T11 by controlling the oil pressure to the disengaging-side clutch currently being engaged, and the coupling torque is held during a period until a gear change start timing B.

At a gear change start timing B, the supply of oil pressure to the engaging-side clutch is started, and the oil pressure to the engaging-side clutch is linearly increased at a constant ratio, thereby raising a coupling torque Ton from T0 (zero) to T21. At the same time, the oil pressure of the disengaging-side clutch is linearly reduced at a constant ratio, thereby decreasing the coupling torque Toff from T11 to T0 (zero). After that, the coupling torque Ton is maintained at T21 by holding the oil pressure of the engaging-side clutch until a gear change end timing C. At the gear change end timing C, the coupling torque Ton is raised to T20 by raising the oil pressure of the engaging-side clutch, and shift control is complete.

In the above-described shift control, the period from the gear change start timing B to the timing at which the coupling torque Ton of the engaging-side clutch rises to T21 is called a co-meshing (concurrently engaging) period L1. In the co-meshing period L1, the body G (the acceleration applied to the body of a car) fluctuates due to the difference between the torque transmission capacities of the disengaging-side clutch and engaging-side clutch, and shift shock occurs. Accordingly, engine racing and shift shock can be suppressed by properly controlling the coupling torques of the disengaging-side and engaging-side clutches. Note that as shown in FIG. 3A, torque pull-in which causes engine racing or shift shock increases from the gear change start timing B at which co-meshing is started, and the pull-in amount increases in proportion to the coupling torques of both the disengaging-side clutch and engaging-side clutch. In the co-meshing period L1, a period L1a before a torque pull-in point D at which the torque pull-in amount is largest will be called a torque phase, and a period from a post period L1b to C will be called an inertia phase.

When normal shift control as shown in FIG. 3A is performed in a period requiring initial run-in control, the friction coefficient (μ) of the clutch surface (friction surface) becomes low. Therefore, while a preceding-stage clutch is disengaged and a succeeding-stage clutch is engaged, torque missing by which torque transmission is temporarily interrupted occurs, so engine racing may occur or shift shock may worsen.

Figure 3B:
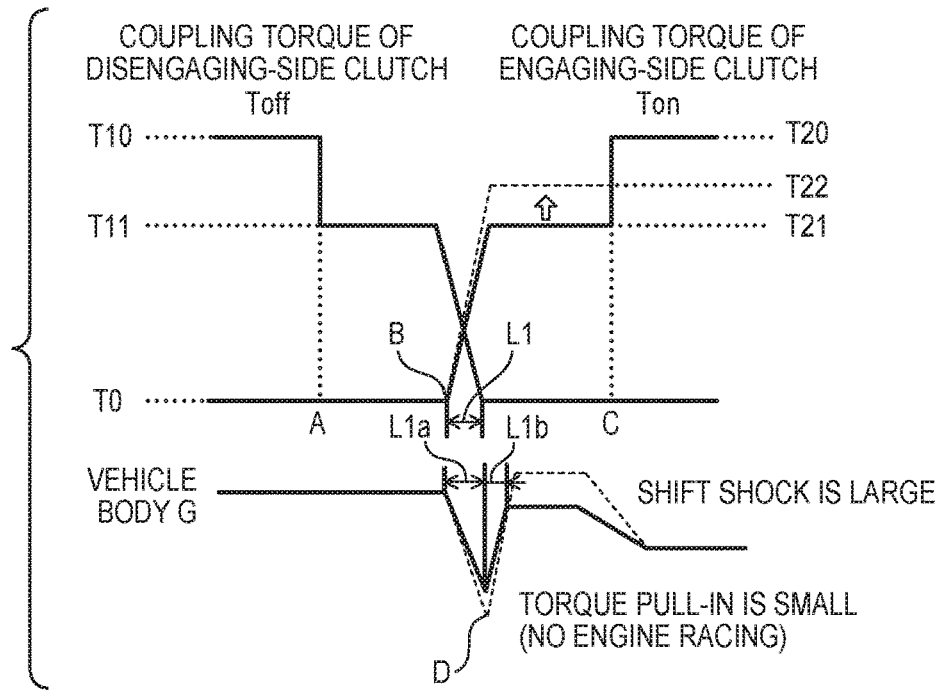

To solve this problem, as shown in FIG. 3B, the coupling torque Ton of the engaging-side clutch is set high (T22) from the gear change start timing B at which co-meshing is started to the gear change end timing C, during the period requiring initial run-in. As a consequence, engine racing can be suppressed because the clutch surface pressure increases, but shift shock occurs because the coupling torque is increased.

In the present embodiment as shown in FIG. 3C, therefore, during a period in which the clutch absorbs a heat quantity (calorie or heat amount) necessary for initial run-in control, the co-meshing period L1 of gear change is extended to a period L2 near the gear change end timing C, and initial run-in is promoted by increasing the coupling torques (the co-meshing amount) of the disengaging-side clutch and engaging-side clutch in the co-meshing period L2. More specifically, both the coupling torque Ton of the engaging-side clutch and the coupling torque Toff of the disengaging-side clutch are increased at an inertia phase L2b after a torque phase L2a. That is, the coupling torque Ton of the engaging-side clutch is linearly increased from the gear change start timing B to T23 (>T21), and T23 is maintained until the gear change end timing C. In addition, the coupling torque Toff of the disengaging-side clutch, which is linearly decreased from the gear change start timing B, is increased to T12 (>T0) and held during the co-meshing period L2. This makes it possible to suppress engine racing and shift shock, and ensure the dischargeability of oil from the clutch surface because the clutch surface pressure increases, thereby promoting initial run-in. If it is determined that the clutch has absorbed a heat quantity necessary for initial run-in, the process returns to normal shift control shown in FIG. 3A, and initial run-in control is terminated.

Initial run-in control of the present embodiment will be explained below with reference to a flowchart shown in FIG. 4.

Figure 4:
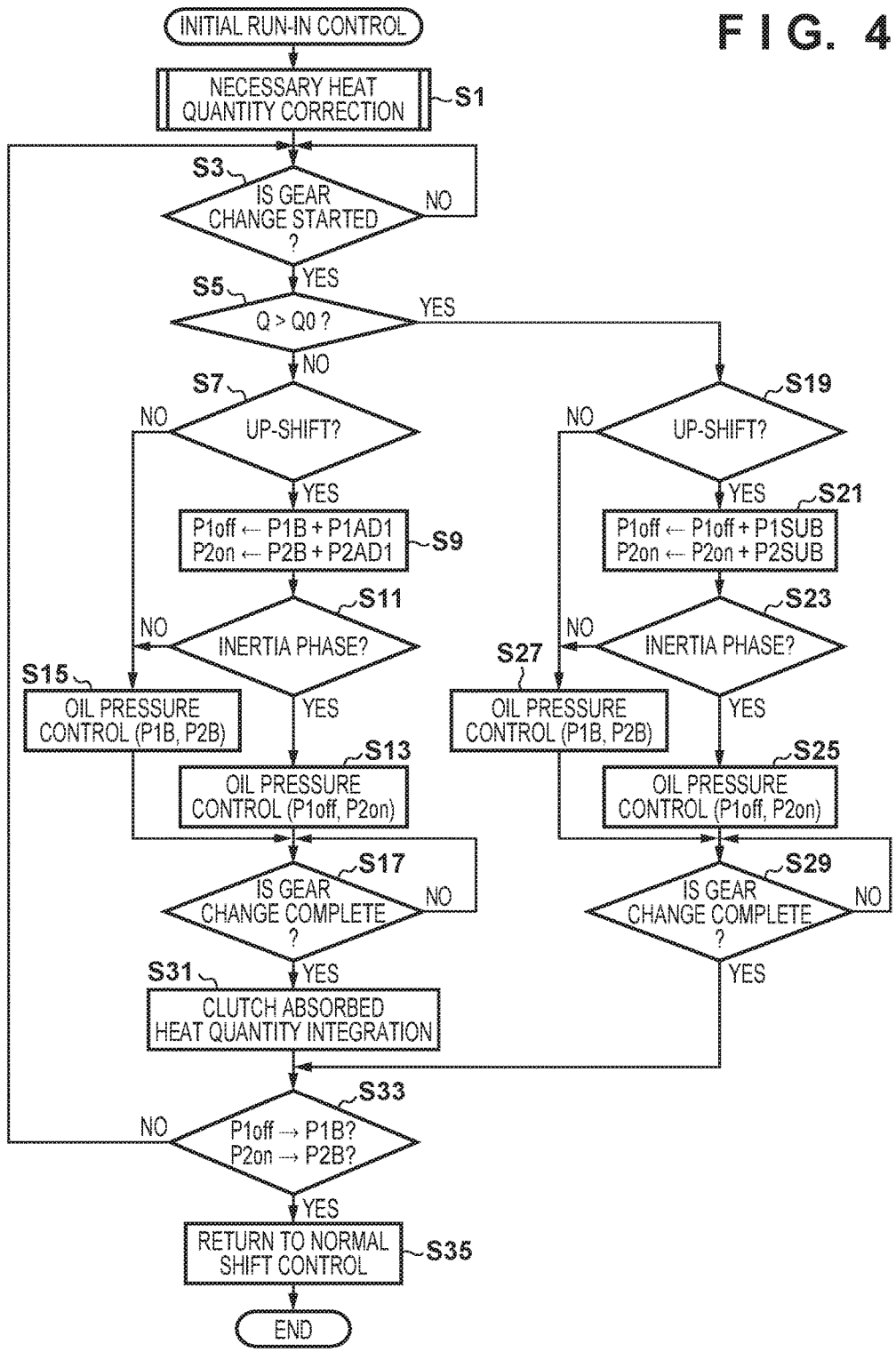
FIG. 4 is a flowchart showing initial run-in control of the embodiment.

Note that this flowchart shown in FIG. 4 is started when the engine is started, and implemented by the CPU of the shift controller 74 by loading, in the RAM, the shift control program and shift map stored in the ROM, and executing the program by a predetermined cycle. The shift control program is a program for executing initial run-in control of the present embodiment. This similarly applies to FIG. 6 to be described later.

In step S1, the shift controller 74 performs a correction process of correcting a necessary heat quantity in accordance with the degree of a lifelong heat quantity absorbed by a clutch by initial run-in control. Details of this correction process will be described later.

In step S3, the shift controller 74 waits until it is determined that gear change is started, from the running state defined by the vehicle speed V and accelerator position AP and the shift map (not shown). If it is determined that gear change is started, the shift controller 74 advances the process to step S5.

In step S5, the shift controller 74 determines whether the integrated value (to be referred to as a clutch absorbed heat quantity hereinafter) Q of a heat quantity absorbed by the clutch on each of the disengaging side and engaging side has exceeded a heat quantity (to be referred to as a necessary heat quantity hereinafter) Q0 necessary for initial run-in control. The clutch absorbed heat quantity Q is naturally zero in the first cycle of initial run-in control. Also, the necessary heat quantity Q0 is predetermined (for example, 10,000 joules) by experiments or the like in accordance with the type of transmission, the engine output, and the like, and stored in the ROM of the shift controller 74. In addition, the clutch absorbed heat quantities Q absorbed by the clutches in individual cycles of initial run-in control are sequentially stored in the ROM of the shift controller 74 and updated. Note that in the present embodiment, the clutch absorbed heat quantity Q is the sum of the integrated values of heat quantities absorbed by each clutch when it is disengaged and engaged.

$$Q = \int T \Delta \omega \, dt \quad (1)$$

where T is the torque transmission capacity of the clutch, and $\Delta\omega$ is the input/output rotational speed difference of the clutch, and equal to a slippage [rad/s] to be given to the disengaging-side clutch before the start of gear change.

If the shift controller 74 determines in step S5 that the clutch absorbed heat quantity Q has exceeded the necessary heat quantity Q0, the shift controller 74 advances the process to step S19. If the shift controller 74 determines in step S5 that the clutch absorbed heat quantity Q is equal to or less than the necessary heat quantity Q0, the shift controller 74 advances the process to step S7.

In step S7, the shift controller 74 determines whether the gear change is shift-up. If it is determined that the gear change is shift-up, the shift controller 74 advances the process to step S9. If it is determined that the gear change is not shift-up, that is, the gear change is shift-down, the shift controller 74 advances the process to step S15.

In step S9, as explained with reference to FIG. 3C, the shift controller 74 increases the pressures by adding predetermined values P1AD and P2AD1 to oil pressure base values P1B and P2B for use in normal shift control, in order to increase the coupling torque Toff of the disengaging-side clutch and the coupling torque Ton of the engaging-side clutch. More specifically, an oil pressure P1off of the coupling torque Toff of the disengaging-side clutch is calculated by adding the predetermined value P1AD1 to the oil pressure base value P1B, and an oil pressure P2on of the coupling torque Ton of the engaging-side clutch is calculated by adding the predetermined value P2AD1 to the oil pressure base value P2B. Note that the predetermined values P1AD1 and P2AD1 are predetermined (for example, 10 Nm) by experiments or the like in accordance with the type of transmission, the engine output, and the like, and stored in the ROM of the shift controller 74.

In step S11, the shift controller 74 determines whether this is a timing at which the shift operation proceeds to the inertia phase. If it is determined that this is the timing at which shift operation proceeds to the inertia phase, the shift controller 74 advances the process to step S13. If it is determined that this is not the timing at which the shift operation proceeds to the inertia phase, the shift controller 74 advances the process to step S15. Whether this is the timing of proceeding to the inertia phase can be performed based on the time having passed since the start of gear change.

In step S13, the shift controller 74 controls the coupling torque Toff of the disengaging-side clutch and the coupling torque Ton of the engaging-side clutch based on the oil pressures P1off and P2on calculated in step S9. In step S15, the shift controller 74 controls the coupling torque Toff of the disengaging-side clutch and the coupling torque Ton of the engaging-side clutch based on the oil pressure base values P1B and P2B. In steps S13 and S15, whether to control the coupling torque Toff of the disengaging-side clutch and the coupling torque Ton of the engaging-side clutch by the base values P1B and P2B or the added values P1off and P2on is switched in accordance with whether this is the timing at which the shift operation proceeds to the inertia phase. This is so because in the inertia phase, the rotation difference between the disengaging-side clutch and engaging-side clutch increases, and heat generation is maximum (most of heat generation). In other words, in phases other than the inertia phase, the heat quantities absorbed by the disengaging-side clutch and engaging-side clutch do not increase so much, and the degree of contribution to the clutch absorbed heat quantities is small, so control is performed by using the base values.

In step S17, the shift controller 74 waits until the shift operation is complete, and advances the process to step S31 when the shift operation is complete. The shift controller 74 determines that the shift operation is complete, if the shift operation proceeds to the gear change end timing C explained with reference to FIG. 3C.

Figure 5A:
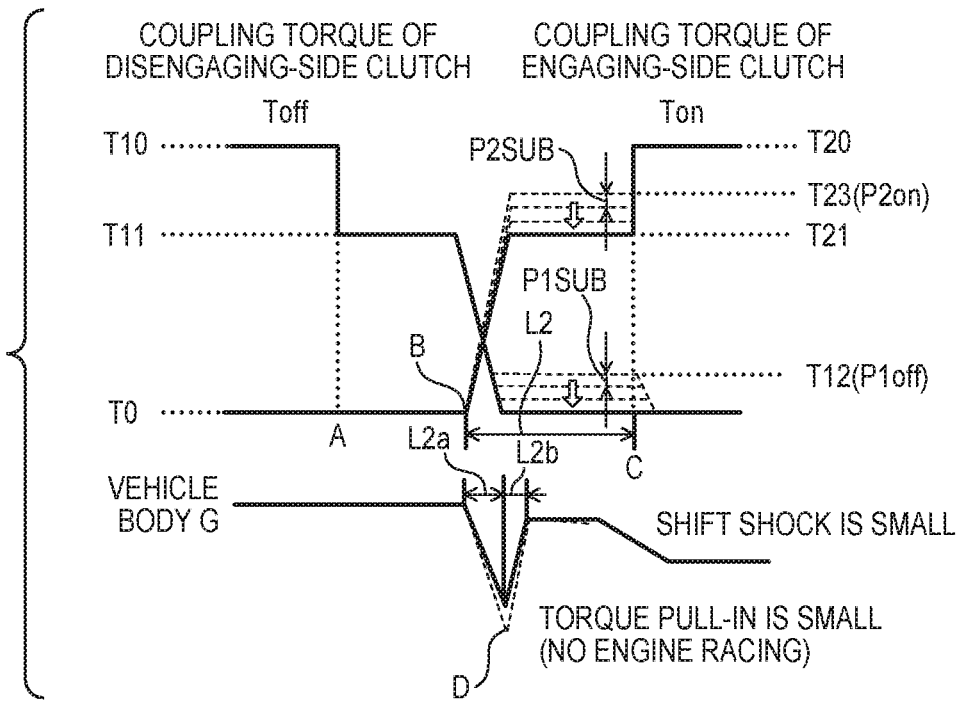
FIG. 5A is a timing chart showing changes in clutch coupling torques during a shift operation under initial run-in control of the embodiment.

On the other hand, if the shift controller 74 determines in step S5 that the clutch absorbed heat quantity Q has exceeded the necessary heat quantity Q0, the shift controller 74 performs a process of reducing the oil pressures P1off and P2on calculated in step S9 (steps S19 to S29). FIG. 5A is a timing chart showing changes in coupling torques when gradually returning the coupling torques of the disengaging-side clutch and engaging-side clutch to the base values in initial run-in control. In the present embodiment, control is performed such that the oil pressure is returned to the base value at once after the clutch absorbed heat quantity Q has exceeded the necessary heat quantity Q0, so as not to abruptly decrease the coupling torque. More specifically, a predetermined value P1SUB is subtracted from the oil pressure P1off of the coupling torque Toff of the disengaging-side clutch, and a predetermined value P2SUB is subtracted from the oil pressure P2on of the coupling torque Ton of the engaging-side clutch. Note that the predetermined values P1SUB and P2SUB are predetermined (for example, 0.2 Nm) by experiments or the like in accordance with the type of transmission, the engine output, and the like, and stored in the ROM of the shift controller 74.

In step S19, the shift controller 74 determines whether the gear change is shift-up, as in step S7. If it is determined that the gear change is shift-up, the shift controller 74 advances the process to step S21. If it is determined that the gear change is not shift-up, that is, the gear change is shift-down, the shift controller 74 advances the process to step S27.

In step S21, as shown in FIG. 5A, the shift controller 74 subtracts the predetermined values P1SUB and P2SUB from the oil pressures P1off and P2on calculated in step S9, in order to gradually return the coupling torque Toff of the disengaging-side clutch and the coupling torque Ton of the engaging-side clutch to the base values.

In step S23, the shift controller 74 determines whether this is the timing at which the shift operation proceeds to the inertia phase, as in step S11. If it is determined that this is the timing of proceeding to the inertia phase, the shift controller advances to the process to step S25. If it is determined that this is not the timing of proceeding to the inertia phase, the shift controller 74 advances the process to step S27.

In this S25, the shift controller 74 controls the coupling torque Toff of the disengaging-side clutch and the coupling torque Ton of the engaging-side clutch based on the oil pressures P1off and P2on reduced in step S21. In this S27, the shift controller 74 controls the coupling torque Toff of the disengaging-side clutch and the coupling torque Ton of the engaging-side clutch based on the oil pressure base values P1B and P2B. In steps S25 and S27, whether to control the coupling torque Toff of the disengaging-side clutch and the coupling torque Ton of the engaging-side clutch by the base values P1B and P2B or the reduced values P1off and P2on is switched in accordance with whether this is the timing at which the shift operation proceeds to the inertia phase. The reason is the same as that explained in step S13.

In step S29, the shift controller 74 waits until the shift operation is complete, and advances the process to step S31 if the shift operation is complete. The shift controller 74 determines that the shift operation is complete, when the shift operation proceeds to the gear change end timing C explained with reference to FIG. 3C.

In step S31, the shift controller 74 integrates the heat quantity Q absorbed by each clutch in this shift control cycle in accordance with equation (1), updates the integrated value (lifelong heat quantity) stored in the ROM of the shift controller 74, and advances to step S33.

In step S33, the shift controller 74 determines whether the oil pressures P1off and P2on calculated in step S9 have returned to the base values P1B and P2B by the subtraction in step S21. The shift controller 74 advances the process to step S35 if it is determined that the values have returned, and returns the process to step S3 if it is determined that the values have not returned yet.

In step S35, the shift controller 74 terminates initial run-in control, and returns to normal shift control, thereby completing the process.

In the present embodiment as described above, it is possible to promote initial run-in of a transmission in a period requiring initial run-in while suppressing engine racing and shift shock.

Modification

In the above-described embodiment, the coupling torques of the disengaging-side clutch and engaging-side clutch are gradually returned to the base values as explained with reference to FIG. 5A. However, even when the clutch absorbed heat quantity reaches the necessary heat quantity by initial run-in control, the effect has variations, so engine racing sometimes occurs.

Figure 5B:
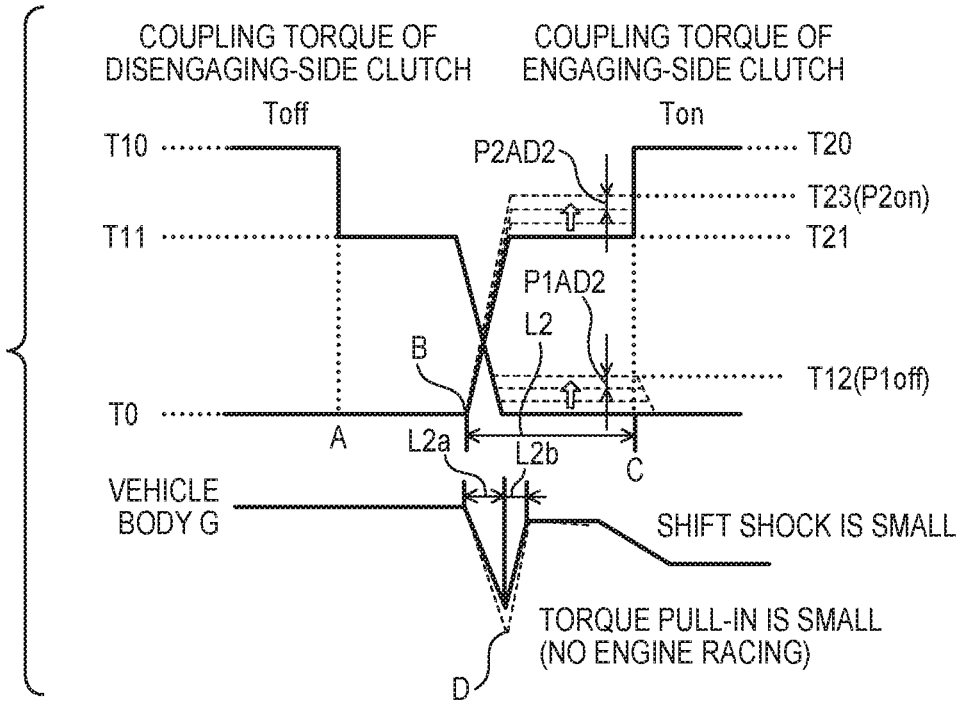
FIG. 5B is a timing chart showing changes in clutch coupling torques during a shift operation under initial run-in control of a modification of the embodiment.

In this modification, therefore, when returning the coupling torque Toff of the disengaging-side clutch and the coupling torque Ton of the engaging-side clutch to the base values in the above-described initial run-in control, predetermined values P1AD2 and P2AD2 are added to the oil pressures P1off and P2on of the reduced coupling torques Toff and Ton of the disengaging-side clutch and engaging-side clutch, as shown in FIG. 5B. This slightly increases the co-meshing amount of the disengaging-side clutch and engaging-side clutch, thereby suppressing engine racing.

The modification of initial run-in control of the present embodiment will be explained below with reference to a flowchart shown in FIG. 6.

Figure 6:
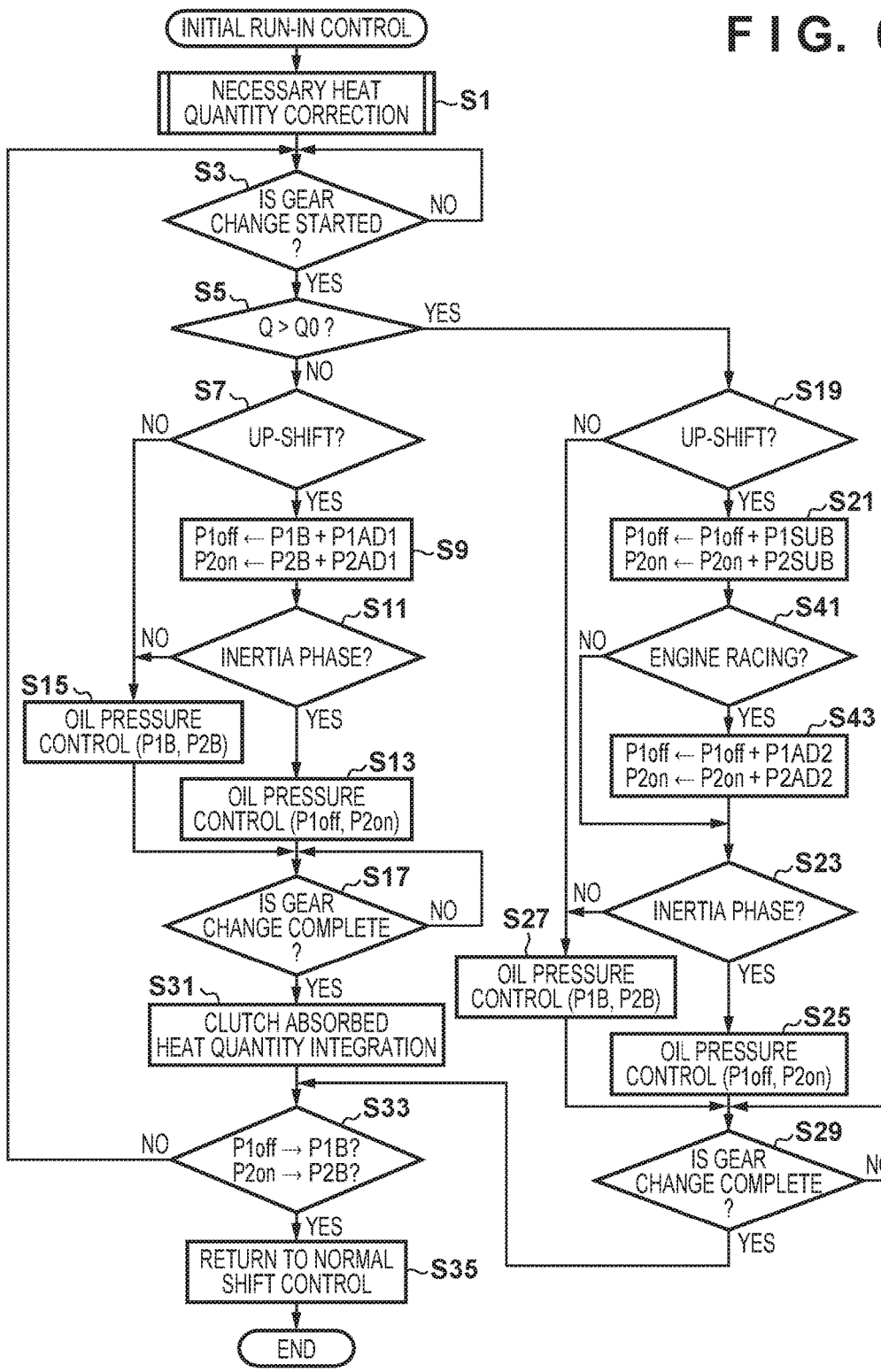
FIG. 6 is a flowchart showing initial run-in control of the modification of the embodiment.

Note that an explanation of the same processes as in FIG. 4 will be omitted by denoting them by the same reference numerals in the flowchart of FIG. 6, and differences will mainly be explained.

In step S41 after the subtraction process in step S21, the shift controller 74 monitors the main shaft rotational speed difference before and after gear change, thereby detecting engine racing. The shift controller 74 advances the process to step S43 if engine racing is detected in step S41, and advances the process to step S23 if no engine racing is detected. Note that this engine racing determination can be performed by the differential rotation (slippage) of the disengaging-side clutch before gear change. The differential rotation of the disengaging-side clutch can be calculated by the difference between an expected main shaft rotational speed obtained by the vehicle speed and the disengaging-side gear ratio and the actual main shaft rotational speed.

In step S43, as in step S9, as described with reference to FIG. 5B, the shift controller 74 adds the predetermined values P1AD2 and P2AD2 to the oil pressures P1off and P2on to the coupling torque Toff of the disengaging-side clutch and the coupling torque Ton of the engaging-side clutch, which are reduced in step S21. After that, in step S25, the shift controller 74 controls the coupling torque Toff of the disengaging-side clutch and the coupling torque Ton of the engaging-side clutch based on the oil pressures P1off and P2on calculated in step S43, and advances the process to step S29.

Note that the values P1SUB and P2SUB to be subtracted in step S21 and the values P1AD2 and P2AD2 to be added in step S43 can be either the same or different.

In this modification as described above, if engine racing is detected when returning the coupling torque Toff of the disengaging-side clutch and the coupling torque Ton of the engaging-side clutch to the base values in the above-described initial run-in control, this engine racing can be suppressed by slightly increasing the co-meshing amount of the disengaging-side clutch and engaging-side clutch.

<Necessary Heat Quantity Correcting Process in Initial Run-in Control>

The necessary heat quantity correcting process in step S1 of initial run-in control of the present embodiment shown in FIGS. 4 and 6 will now be explained with reference to a timing chart shown in FIG. 7 and a flowchart shown in FIG. 8.

When the clutch absorbed heat quantity increases by initial run-in control explained with reference to FIGS. 4 and 6, a main shaft rotation change amount (at least one of the change amount, change time, and change rate of the rotational speed) $\Delta NM$ changes when the accelerator is OFF (when the accelerator pedal switch is OFF) and the gear is engaged (when the D range is selected from the N range or P range), as shown in FIG. 7. More specifically, the degree (heat quantity absorption degree) of the lifelong heat quantity absorbed by the clutch in initial run-in control increases. That is, as the clutch absorbed heat quantity increases, the main shaft rotation change amount $\Delta NM$ increases ($\Delta NM1 > \Delta NM2 > \Delta NM3$), and the main shaft rotational speed NM decreases faster (NM1>NM2>NM3). Accordingly, the heat quantity absorption degree is determined by initial run-in control by using the main shaft rotation change amount $\Delta NM$ as an index indicating the heat quantity absorption degree, and the correcting process is performed so as to reduce the necessary heat quantity as a determination threshold of the clutch absorbed heat quantity as the heat quantity absorption degree increases. Note that in the transmission T of the present embodiment, the main shaft corresponds to the odd-numbered-stage input shaft 16 because the first speed is the start gear when the gear is engaged from the N range or P range to the D range.

The necessary heat quantity correcting process (the processing in step S1 of FIGS. 4 and 6) in initial run-in control of the present embodiment will be explained below with reference to a flowchart shown in FIG. 8.

In step S51, the shift controller 74 determines whether the clutch absorbed heat quantity Q shown in FIGS. 4 and 6 has exceeded a threshold obtained by subtracting a predetermined amount $\alpha$ from the necessary heat quantity Q0. If it is determined in step S51 that the clutch absorbed heat quantity Q has exceeded necessary heat quantity Q0-$\alpha$, the shift controller 74 advances the process to step S53. If it is determined in step S51 that the clutch absorbed heat quantity Q is equal to or smaller than necessary heat quantity Q0-$\alpha$, the shift controller 74 terminates the process.

In step S53, the shift controller 74 determines whether the vehicle is stopped. In this step, the shift controller 74 determines that the vehicle is stopped if the accelerator pedal switch is OFF (the accelerator position AP is zero) and the brake pedal switch is ON (the vehicle speed v is zero). If it is determined in step S53 that the vehicle is stopped, the shift controller 74 advances the process to step S55. If it is determined in step S53 that the vehicle is not stopped, that is, the vehicle is running, the shift controller 74 terminates the process.

In step S55, the shift controller 74 determines whether the transmission T is in an in-gear state. More specifically, the shift controller 74 determines that the transmission T is in the in-gear state if the N range or P range is switched to the D range. Note that the in-gear state corresponds to a state in which the first clutch 24 is coupled after a pre-shift operation to the first-gear stage. If it is determined in step S55 that the transmission T is in the in-gear state, the shift controller 74 advances the process to step S57. If it is determined that the transmission T is not in the in-gear state, the shift controller 74 terminates the process.

In step S57, the shift controller 74 detects and calculates the rotation change amount $\Delta NM$ of the main shaft (in the present embodiment, the odd-numbered-stage input shaft 16).

In step S59, the shift controller 74 determines whether the main shaft rotation change amount $\Delta NM$ has exceeded a predetermined threshold $\Delta NM1$. If it is determined in step S59 that the main shaft rotation change amount $\Delta NM$ has exceeded the threshold $\Delta NM1$, the shift controller 74 advances the process to step S61. If it is determined in step S59 that the main shaft rotation change amount $\Delta NM$ is equal to or smaller than the threshold $\Delta NM1$, the shift controller 74 advances the process to step S63. Note that the threshold $\Delta NM1$ is predetermined by experiments or the like, and stored in the ROM of the shift controller 74.

In step S61, the shift controller 74 determines that the heat quantity absorption degree is large (satisfies a predetermined level) because the decrease in main shaft rotational speed NM is fast (the time before in-gear is short). Therefore, the shift controller 74 subtracts a predetermined quantity $\Delta Q$ from the necessary heat quantity Q0, and updates the value of the necessary heat quantity Q0 stored in the ROM. Note that the predetermined quantity $\Delta Q$ is predetermined by experiments or the like, and stored in the ROM of the shift controller 74.

Also, in step S63, the shift controller 74 determines that the heat quantity absorption degree is small (does not satisfy the predetermined level) because the decrease in main shaft rotational speed NM is slow (the time before in-gear is long). Therefore, the shift controller 74 adds the predetermined quantity $\Delta Q$ to the necessary heat quantity Q0, and updates the value of the necessary heat quantity Q0 stored in the ROM.

The necessary heat quantities Q0 calculated in steps S61 and S63 are used in the clutch absorbed heat quantity determination process explained in step S5 of FIGS. 4 and 6. That is, the heat quantity Q0 necessary for initial run-in control is properly adjusted in accordance with the heat quantity absorption degree obtained by initial run-in control at that time.

Note that the heat quantity absorption degree is evaluated by using the rotation change amount $\Delta NM$ of the main shaft as an evaluation value in the present embodiment, but it is also possible to use the rotation change time or rotation change rate of the main shaft as an evaluation value. In this case, it is possible to determine that the heat quantity absorption degree is large if the main shaft rotation change time is short or the main shaft rotation change rate is high, and determine that the heat quantity absorption degree is small if the main shaft rotation change time is long or the main shaft rotation change rate is low.

In the present embodiment as described above, the heat quantity absorption degree in initial run-in control is evaluated by using the main shaft rotation change amount $\Delta NM$ as an evaluation value in a state in which the vehicle is stable with the accelerator being OFF and the gear being engaged. This makes it possible to properly adjust the necessary heat quantity Q0 as an evaluation threshold of the clutch absorbed heat quantity Q.

The above-described embodiment is an example for implementing the present invention, and the present invention is applicable to a correction or modification of the embodiment without departing from the scope of the invention. For example, the clutch coupling torque is increased in the co-meshing period in the present embodiment, but the oil pressure supply time may also be controlled. It is also possible to apply initial run-in control of the present embodiment to control of clutch deterioration. In this case, the deteriorated state of a clutch is determined from the current clutch absorbed heat quantity (lifelong heat quantity), and control methods are switched in accordance with the determination result.

Initial run-in control of the present embodiment is applicable not only to a twin-clutch transmission, but also to a conventional automatic transmission called 4AT or 5AT which establishes a gear stage by a planetary gear or disengagement and engagement of a clutch and brake. In addition, an engine (internal combustion engine) is taken as an example of a motor, but the present invention is not limited to this and also applicable to a hybrid of an engine and electric motor or an electric motor.

Furthermore, the present invention can also be achieved by supplying, to a computer mounted on a vehicle, a computer program corresponding to initial run-in control of the above-described embodiment or a storage medium storing the computer program, and reading out and executing a program code stored in the storage medium by the computer.

Summary of Embodiment (Configuration 1)

A control apparatus of an automatic transmission (T) including a plurality of gear mechanisms (60) and frictional elements (24, 26) for establishing a gear stage, comprises an oil pressure supply device (70) configured to supply an oil pressure for operating the frictional elements (24, 26) between an engaged state in which the frictional elements are coupled to enable torque transmission, and a disengaged state in which the engaged state is released, and an oil pressure controller (74) configured to control an oil pressure for operating the plurality of frictional elements such that one of the frictional elements is engaged (Ton) and the other of the frictional elements is disengaged (Toff) during a shift operation, wherein the oil pressure controller (74) determines a heat quantity (Q) absorbed by the plurality of frictional elements (24, 26) when the frictional elements (24, 26) are switched between the engaged state and the disengaged state, and changes an operation state before the frictional elements (24, 26) proceed to the engaged state or the disengaged state, in accordance with whether the frictional elements (24, 26) have absorbed a predetermined heat quantity (Q0).

Configuration 1 can promote heat quantity absorption while suppressing engine racing and shift shock until the frictional element of the automatic transmission absorbs a necessary heat quantity.

(Configuration 2)

In configuration 1 described above, the oil pressure controller (74) executes initial run-in control for applying heat to frictional surfaces of the frictional elements (24, 26), determines whether each of the frictional elements (24, 26) has absorbed the predetermined heat quantity (Q0) in the initial run-in control, increases oil pressures to be supplied to an engaging-side frictional element and a disengaging-side frictional element in a shift operation (L2) to predetermined oil pressures (P1off, P2on), if it is determined that the predetermined heat quantity has not been absorbed, and returns the initial run-in control to normal shift control in which the engaging-side frictional element and the disengaging-side frictional element are controlled by base oil pressures (P1B, P2B), if it is determined that the predetermined heat quantity (Q0) has been absorbed.

Configuration 2 can promote initial run-in of the frictional element of the automatic transmission while suppressing engine racing and shift shock in a period requiring the initial run-in.

(Configuration 3)

In configuration 2 described above, the initial run-in control is executed when a shift operation is up-shift, and at a timing at which the shift operation proceeds to an inertia phase (L2b).

Configuration 3 can promote initial run-in by causing the frictional element to absorb a heat quantity by the inertia phase occupying most of heat generation.

(Configuration 4)

In configuration 2 or 3 described above, if it is determined that the predetermined heat quantity (Q0) has been absorbed, the oil pressure controller (74) executes the initial run-in control by oil pressures obtained by gradually subtracting predetermined amounts (P1SUB, P2SUB) from the increased oil pressures (P1off, P2on), and returns the initial run-in control to the normal shift control.

Configuration 4 can suppress abrupt torque fluctuations of the disengaging-side frictional element and engaging-side frictional element after it is determined that the frictional elements have absorbed the necessary heat quantity.

(Configuration 5)

In any one of configurations 2 to 4 described above, when determining that the predetermined heat quantity (Q0) has been absorbed and performing the initial run-in control by oil pressures obtained by gradually subtracting predetermined amounts (P1SUB, P2SUB) from the increased oil pressures (P1off, P2on), if a predetermined rotational fluctuation is detected on an input shaft coupled with the disengaging-side frictional element, the oil pressure controller (74) executes the initial run-in control by oil pressures obtained by adding predetermined amounts (P1AD2, P2AD2) to the reduced oil pressures.

Configuration 5 can suppress abrupt torque fluctuations of the disengaging-side frictional element and engaging-side frictional element after it is determined that the frictional elements have absorbed the necessary heat quantity, and, if engine racing occurs, can suppress engine racing and shift shock by adjusting the oil pressure.

(Configuration 6)

In any one of configurations 1 to 5 described above, the transmission (T) includes a first frictional element (24) configured to transmit a driving force of a motor (10) to an input shaft (16) provided with a gear selecting mechanism (60) configured to select a predetermined gear stage from a plurality of first gear stages, and a second frictional element (26) configured to transmit the driving force of the motor (10) to an input shaft (14) provided with a gear selecting mechanism (60) configured to select a predetermined gear stage from a plurality of second gear stages, and the oil pressure controller (74) switches the engaged state and the disengaged state of the first frictional element (24) and the second frictional element (26) in the shift operation.

Configuration 6 can promote initial run-in of the frictional element of a twin-clutch automatic transmission while suppressing engine racing and shift shock in a period requiring the initial run-in.

(Configuration 7)

In configuration 6 described above, each of the first frictional element (24) and the second frictional element (26) is a multi-plate wet clutch which operates by an oil pressure.

Configuration 7 can promote initial run-in of the multi-plate wet clutch of the twin-clutch automatic transmission while suppressing engine racing and shift shock in a period requiring the initial run-in.

(Configuration 8)

A control method of an automatic transmission including:

a plurality of gear mechanisms (60) and frictional elements (24, 26) for establishing a gear stage, an oil pressure supply device (70) configured to supply an oil pressure for operating the frictional elements between an engaged state in which the frictional elements are coupled to enable torque transmission, and a disengaged state in which the engaged state is released, and an oil pressure controller (74) configured to control an oil pressure for operating the plurality of frictional elements such that one of the frictional elements is engaged (Ton) and the other of the frictional elements is disengaged (Toff) during a shift operation, the method comprising:

determining a heat quantity (Q) absorbed by the plurality of frictional elements when the frictional elements are switched between the engaged state and the disengaged state; and changing an operation state until the frictional elements proceed to the engaged state or the disengaged state, in accordance with whether the frictional elements have absorbed a predetermined heat quantity (Q0).

Configuration 8 can promote heat quantity absorption while suppressing engine racing and shift shock until the frictional element of the automatic transmission absorbs the necessary heat quantity.

(Configuration 9)

A control apparatus of an automatic transmission (T) including a plurality of gear mechanisms (60) and frictional elements (24, 26) for establishing a gear stage, comprising:

an oil pressure supply device (70) configured to supply an oil pressure for operating the frictional elements (24, 26) between an engaged state in which the frictional elements are coupled to enable torque transmission, and a disengaged state in which the engaged state is released; and an oil pressure controller (74) configured to control an oil pressure for operating the plurality of frictional elements such that one of the frictional elements is engaged (Ton) and the other of the frictional elements is disengaged (Toff) during a shift operation, wherein the oil pressure controller (74) determines a heat quantity (Q) absorbed by the plurality of frictional elements (24, 26) when the frictional elements (24, 26) are switched between the engaged state and the disengaged state, changes an operation state before the frictional elements (24, 26) proceed to the engaged state or the disengaged state, in accordance with whether the frictional elements (24, 26) have absorbed a predetermined heat quantity (Q0), and performs a correction process of correcting the predetermined heat quantity in accordance with a heat quantity absorption degree indicating a lifelong heat quantity absorbed by the frictional element.

(Configuration 10)

A control method of an automatic transmission including:

a plurality of gear mechanisms (60) and frictional elements (24, 26) for establishing a gear stage;

an oil pressure supply device (70) configured to supply an oil pressure for operating the frictional elements between an engaged state in which the frictional elements are coupled to enable torque transmission, and a disengaged state in which the engaged state is released; and an oil pressure controller (74) configured to control an oil pressure for operating the plurality of frictional elements such that one of the frictional elements is engaged (Ton) and the other of the frictional elements is disengaged (Toff) during a shift operation, the method comprising:

determining a heat quantity (Q) absorbed by the plurality of frictional elements when the frictional elements are switched between the engaged state and the disengaged state;

changing an operation state before the frictional elements proceed to the engaged state or the disengaged state, in accordance with whether the frictional elements have absorbed a predetermined heat quantity (Q0), and correcting the predetermined heat quantity in accordance with a heat quantity absorption degree indicating a lifelong heat quantity absorbed by the frictional element.

According to configurations 9 and 10, the heat quantity necessary for initial run-in control can be properly adjusted in accordance with the heat quantity absorption degree obtained by initial run-in control at that time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Applications No. 2016-052932, filed Mar. 16, 2016, and No. 2016-052933, filed Mar. 16, 2016, which are hereby incorporated by reference herein in their entirety.

What is claimed is:

1. A control apparatus of an automatic transmission including a plurality of gear mechanisms and frictional elements for establishing a gear stage, comprising:

an oil pressure supply device configured to supply an oil pressure for operating the frictional elements between an engaged state in which the frictional elements are coupled to enable torque transmission, and a disengaged state in which the engaged state is released; and an oil pressure controller configured to control an oil pressure for operating the plurality of frictional elements such that one of the frictional elements is engaged and the other of the frictional elements is disengaged during a shift operation, wherein the oil pressure controller determines a heat quantity absorbed by the plurality of frictional elements when the frictional elements are switched between the engaged state and the disengaged state, and changes an operation state before the frictional elements proceed to the engaged state or the disengaged state, in accordance with whether the frictional elements have absorbed a predetermined heat quantity.

2. The apparatus according to claim 1, wherein the oil pressure controller executes initial run-in control for applying heat to frictional surfaces of the frictional elements, determines whether each of the frictional elements has absorbed the predetermined heat quantity in the initial run-in control, increases oil pressures to be supplied to an engaging-side frictional element and a disengaging-side frictional element in a shift operation to predetermined oil pressures, if it is determined that the predetermined heat quantity has not been absorbed, and returns the initial run-in control to normal shift control in which the engaging-side frictional element and the disengaging-side frictional element are controlled by base oil pressures, if it is determined that the predetermined heat quantity has been absorbed.

3. The apparatus according to claim 2, wherein the initial run-in control is executed when a shift operation is up-shift, and at a timing at which the shift operation proceeds to an inertia phase.

4. The apparatus according to claim 2, wherein if it is determined that the predetermined heat quantity has been absorbed, the oil pressure controller executes the initial run-in control by oil pressures obtained by gradually subtracting predetermined amounts from the increased oil pressures, and returns the initial run-in control to the normal shift control.

5. The apparatus according to claim 2, wherein when determining that the predetermined heat quantity has been absorbed and performing the initial run-in control by oil pressures obtained by gradually subtracting predetermined amounts from the increased oil pressures, if a predetermined rotational fluctuation is detected on an input shaft coupled with the disengaging-side frictional element, the oil pressure controller executes the initial run-in control by oil pressures obtained by adding predetermined amounts to the reduced oil pressures.

6. The apparatus according to claim 1, wherein
the transmission includes a first frictional element configured to transmit a driving force of a motor to an input shaft provided with a gear selecting mechanism configured to select a predetermined gear stage from a plurality of first gear stages, and a second frictional element configured to transmit the driving force of the motor to an input shaft provided with a gear selecting mechanism configured to select a predetermined gear stage from a plurality of second gear stages, and the oil pressure controller switches the engaged state and the disengaged state of the first frictional element and the second frictional element in the shift operation.

7. The apparatus according to claim 6, wherein each of the first frictional element and the second frictional element is a multi-plate wet clutch which operates by an oil pressure.

8. A control method of an automatic transmission including:

a plurality of gear mechanisms and frictional elements for establishing a gear stage;

an oil pressure supply device configured to supply an oil pressure for operating the frictional elements between an engaged state in which the frictional elements are coupled to enable torque transmission, and a disengaged state in which the engaged state is released; and an oil pressure controller configured to control an oil pressure for operating the plurality of frictional elements such that one of the frictional elements is engaged and the other of the frictional elements is disengaged during a shift operation, the method comprising:

determining a heat quantity absorbed by the plurality of frictional elements when the frictional elements are switched between the engaged state and the disengaged state; and changing an operation state until the frictional elements proceed to the engaged state or the disengaged state, in accordance with whether the frictional elements have absorbed a predetermined heat quantity.

9. A control apparatus of an automatic transmission including a plurality of gear mechanisms and frictional elements for establishing a gear stage, comprising:

an oil pressure supply device configured to supply an oil pressure for operating the frictional elements between an engaged state in which the frictional elements are coupled to enable torque transmission, and a disengaged state in which the engaged state is released; and an oil pressure controller configured to control an oil pressure for operating the plurality of frictional elements such that one of the frictional elements is engaged and the other of the frictional elements is disengaged during a shift operation, wherein the oil pressure controller determines a heat quantity absorbed by the plurality of frictional elements when the frictional elements are switched between the engaged state and the disengaged state, changes an operation state before the frictional elements proceed to the engaged state or the disengaged state, in accordance with whether the frictional elements have absorbed a predetermined heat quantity, and performs a correction process of correcting the predetermined heat quantity in accordance with a heat quantity absorption degree indicating a lifelong heat quantity absorbed by the frictional element.

10. A control method of an automatic transmission including:

a plurality of gear mechanisms and frictional elements for establishing a gear stage;

an oil pressure supply device configured to supply an oil pressure for operating the frictional elements between an engaged state in which the frictional elements are coupled to enable torque transmission, and a disengaged state in which the engaged state is released; and an oil pressure controller configured to control an oil pressure for operating the plurality of frictional elements such that one of the frictional elements is engaged and the other of the frictional elements is disengaged during a shift operation, the method comprising:

determining a heat quantity absorbed by the plurality of frictional elements when the frictional elements are switched between the engaged state and the disengaged state;

changing an operation state before the frictional elements proceed to the engaged state or the disengaged state, in accordance with whether the frictional elements have absorbed a predetermined heat quantity, and correcting the predetermined heat quantity in accordance with a heat quantity absorption degree indicating a lifelong heat quantity absorbed by the frictional element.

* * * * *